(12) United States Patent
Modica

(10) Patent No.: US 10,184,162 B2
(45) Date of Patent: Jan. 22, 2019

(54) HYDROTHERMAL PROCESS FOR THE TREATMENT OF LEAD GLASS WITH RECOVERY OF LEAD METAL, SOLUBLE AND INSOLUBLE SILICATES AND SILICA

(71) Applicant: Hellatron S.p.A., Milan (IT)

(72) Inventor: Giovanni Modica, Milan (IT)

(73) Assignee: Hellatron S.P.A., Milan (IT)

( * ) Notice: Subject to any disclaimer, the term of this patent is extended or adjusted under 35 U.S.C. 154(b) by 490 days.

(21) Appl. No.: 15/079,497

(22) Filed: Mar. 24, 2016

(65) Prior Publication Data
US 2017/0275734 A1 Sep. 28, 2017

(51) Int. Cl.
C22B 3/00 (2006.01)

(52) U.S. Cl.
CPC .................................. *C22B 13/045* (2013.01)

(58) Field of Classification Search
CPC ..................................................... C22B 13/045
USPC ............................................................ 75/725
See application file for complete search history.

(56) References Cited

U.S. PATENT DOCUMENTS

| | | | | |
|---|---|---|---|---|
| 4,460,442 | A * | 7/1984 | Ducati | C22B 13/045 205/599 |
| 5,453,111 | A * | 9/1995 | Myerson | C21B 13/006 423/109 |
| 2014/0109617 | A1 * | 4/2014 | Grigorenko | C22B 7/006 65/31 |
| 2014/0154157 | A1 * | 6/2014 | Modica | C22B 13/045 423/92 |

FOREIGN PATENT DOCUMENTS

| | | | |
|---|---|---|---|
| CN | 104532002 A | * | 4/2015 |
| EP | 2455500 A1 | | 5/2012 |

OTHER PUBLICATIONS

Zhang, Chenglong, et al. "Recovering Lead from Cathode Ray Tube Funnel Glass by Mechano-Chemical Extraction in Alkaline Solution." Waste Management & Research, vol. 31, No. 7, 2013, pp. 759-763. (Year: 2013).*
H. Miyoshi et al., Chemistry Letters, vol. 33 (2004), No. 8, p. 956, "A Novel Process Utilizing Subcritical Water to Remove Lead from Wasted Lead Silicate Glass".

(Continued)

*Primary Examiner* — Colleen P Dunn
*Assistant Examiner* — Jeremy C Jones
(74) *Attorney, Agent, or Firm* — LeClairRyan PLLC

(57) ABSTRACT

There is described a process completely performed in aqueous phase, which provides a heat etching of lead glass with aqueous solutions of strong alkali followed by an electrolytic treatment of the suspension so obtained, in order to recover metallic lead and obtain soluble silicates, separated from insoluble silicates, both lead-free. The process also provides for the production of pure silica, derived from the soluble silicates, and a possible use thereof to increase the ratio between silica and sodium oxide, which characterizes the specifications of the soluble silicates. The electrolysis for the recovery of metallic lead is implemented in a cell in which the polarity of the electrodes is periodically reversed, to obtain the detachment of the metallic lead deposited on the cathodes.

10 Claims, 1 Drawing Sheet

*Rimonta = Treatment of a solution of Sodium Silicate with powdered silica to increase SiO2/Na2O ratio

(56) References Cited

OTHER PUBLICATIONS

Ryo Sasai et al., Environ. Sci. Technol., vol. 42 (2008), No. 11, pp. 4159-4164, "Development of an Eco-Friendly Material Recycling Process for Spent Lead Glass Using a Mechanochemical Process and Na2EDTA Reagent".

P. G. Yot et al., Journal of Hazardous Materials, vol. 172 (2009), No. 1, pp. 117-123, "Lead Extraction From Waste Funnel Cathode-Ray Tubes Glasses by Reaction With Silicon Carbide and Titanium Nitride".

* cited by examiner

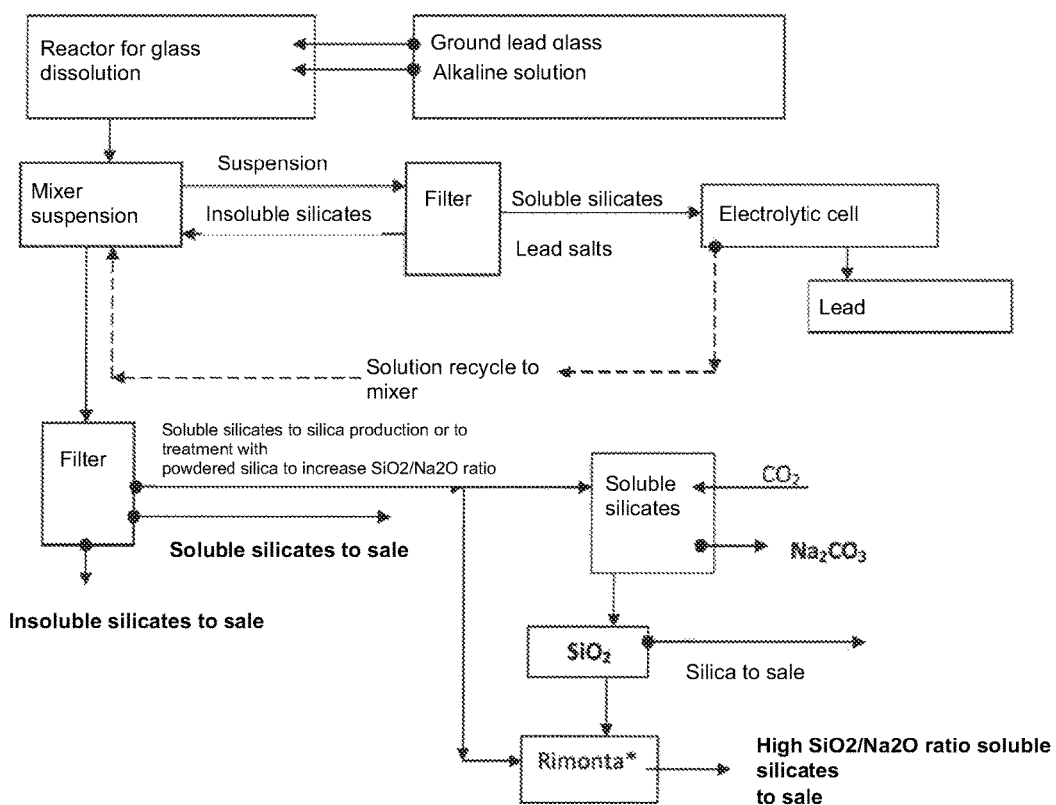
Treatment process for lead glass
*Rimonta = Treatment of a solution of Sodium Silicate with powdered silica to increase SiO2/Na2O ratio

HYDROTHERMAL PROCESS FOR THE TREATMENT OF LEAD GLASS WITH RECOVERY OF LEAD METAL, SOLUBLE AND INSOLUBLE SILICATES AND SILICA

FIELD OF THE INVENTION

The present invention relates to a process for the recovery of lead contained in the rear portion (funnel) of the traditional cathode ray tube screens (CRT).

STATE OF THE ART

EU regulation for Electrical—Electronic Waste (WEEE) have been transposed in Italy by Legislative Decree 151 of 25 Nov. 2005 and the collection of old CRT television sets, classified as R3, implemented by specialised consortia and companies, has resulted in a recovery of over 75,000 tons in 2012.

The treatments that are performed on older television sets are limited to the recovery of plastic materials, electronic boards, electric cables, coils and other metal materials, while operations on the glass parts, consisting of a glass screen, with a high content of barium and strontium, and a glass funnel with high lead content, are limited. The minimum content of this metal in the glass funnel amounts to 17%.

The two types of glass are separated using different methods and the glass screen is ground and recycled at very low prices, to be supplied to ceramic industries or glassworks.

The lead glass, instead, is coarsely crushed and subjected to tumbling, in order to remove the internal and external coatings made with toxic-harmful materials. The clean glass is generally sent to landfill, at higher prices, and rarely finds application in the field of the first/second materials. It should be considered that, on average, 15 kg of glass can be found in the cathode ray tube of a TV set, of which 10 include barium and 5 include lead, and accordingly, at least 0.85 kg of metallic lead can theoretically be recovered from each TV set.

In the scientific literature there are some articles on the treatment of the lead glass. 1) "*A novel process utilizing subcritical water to remove lead from wasted lead silicate glass*", H. Miyoshi et al., *Chemistry Letters*, Vol. 33 (2004), No. 8, p. 956. 2) "*Development of an eco friendly material recycling process for spent lead glass using a mechanochemical process and $Na_2EDTA$ reagent*", Ryo Sasai et al., *Environ. Sci. Technol.*, Vol. 42 (2008), No. 11, pp. 4159-4164. 3) "*Lead extraction from waste funnel cathode-ray tubes glasses by reaction with silicon carbide and titanium nitride*", P. G. Yot et al., *Journal of hazardous Materials*, Vol. 172 (2009), No. 1, pp. 117-123. All the processes described in the articles are basic studies and only the Nulife process (7 Fairhills Business Park, Woodrow Way, Irlam, Manchester M44 6ZQ, United Kingdom) has been used in the industry, in spite of the problems related to high energy consumption and environmental impact.

Patent application EP 2455500 A1 describes a full hydrothermal process of treating lead glass with alkaline aqueous solutions, which claims the recovery of lead exclusively in the form of solid lead sulphide, in a separate step from soluble and insoluble silicates. As described in EP 2455500 A1, the process is effective in recovering from a separate solid phase the lead in the form of sulphide present in the soluble phase, but the process requires the use of $Na_2S$ or $H_2S$, which are very toxic substances that require special care while using them. The lead sulphide (formula is PbS) so obtained, called galena, has always been the raw material used to derive metallic lead with pyrometallurgical processes operating at very high temperatures with a substantial co-production of sulphur dioxide ($SO_2$), highly pollutant substance, to be converted into sulphuric acid and neutralized and converted into sulphates. In EP 2455500 A1, however, there is neither mention of the lead present in the insoluble silicates nor of methodologies for its recovery, so that recovery of this material is not complete, and the process also creates a solid material containing lead without indicating any destination thereof.

SUMMARY OF THE INVENTION

The object of the present invention is to provide a process for treating lead glass obtained from end-of-life CRT television sets. The process is conducted entirely in aqueous phase and allows complete recovery of the lead present in the glass in the form of metal, while the remaining part of glass is transformed and recovered separately in the form of polyvalent cations insoluble silicates present in the structure of the glass, and of monovalent cations soluble silicates present in part in the structure of the glass and added in part during the treatment with the alkaline solution. The present invention also provides for the production of pure silica, by using the soluble silicates obtained with the process, and the application of this silica also to increase the silica/sodium oxide ratio in the soluble silicates. This process further differs from that described in patent application EP 2455500 A1 in that it recovers electrolytically lead in the form of metal, also provides for the production of silica from soluble silicates and the use of the same silica to increase the silica/sodium oxide ratio of the soluble silicates. It also provides for the recovery of lead present in the insoluble silicates by means of an electrolytic process by operating on the entire mass of silicates mixture that results from the sum of soluble and insoluble silicates. All these operations, recovery of lead as a metal, production of silica, increase of the silica/sodium oxide ratio, recovery of lead-free insoluble silicates are not provided for in EP 2455500 A1. The object of this patent is also the methodology implemented to detach the lead deposited on the cathodes of the electrolytic cell. The detachment of the electrolytically deposited lead is implemented without resorting to any mechanical means but only by periodic inversion of the polarity of the electrodes, i.e. the cathode previously covered with lead after the polarity reversal becomes the anode on which oxygen is discharged, which removes the lead previously deposited.

A further object of this patent is the method adopted to quantitatively extract the lead bound in insoluble silicates, which are obtained after the treatment of the glass, by means of an electrolysis process conducted on the liquid/solid mixed phase obtained after the treatment of the glass with the alkaline substance. This new process takes account of the fact that the electrolytic recovery reaction of lead occurs, typically, with a current yield inversely proportional to the concentration of lead in solution, in order to reduce the electrolysis time and to avoid operation with very low current yields, to eliminate residual lead present in solution at very low concentration, typically less than 2 g/l; finally, the object of this patent is a methodology that provides for the reduction to metal lead by the addition of controlled amounts of metallic zinc.

BRIEF DESCRIPTION OF THE FIGURES

The invention will be described below with reference to the unique FIGURE, which schematically shows the process of the invention in the form of flow chart.

DETAILED DESCRIPTION OF THE INVENTION

The objects of the present invention are achieved by performing the following operations:

Heat etching of the ground glass with a very strong alkaline substance aqueous solution to obtain a mixture consisting of a aqueous liquid phase including soluble silicates of monovalent cations, soluble sodium plumbite and soluble lead silicate, and a solid insoluble phase including silicates of all polyvalent cations initially present in the glass and part of the lead.

Recovery of metallic lead by electrolysis of the whole liquid/solid mixed phase obtained after the heat glass etching, by using an electrolytic cell that operates in closed circuit with a mixer and a filter.

Separating the insoluble silicates from the soluble ones at the end of the electrolysis.

Treating the soluble silicates with metallic zinc to break down the residual lead, possibly still present in solution, by cementation.

The liquid phase, consisting of a solution of soluble silicates, forms a first/second material with multiple applications.

Moreover, the liquid phase may be treated with acid in order to obtain the separation of solid silicon oxide (silica) and the formation of soluble salts of alkali metals of the acid being used. The solid silica as such has many uses but can also be used within the process to increase the ratio $R=SiO_2/Na_2O$ making it react at a temperature between 80 and 95° C. with the solution of soluble silicates.

The lead recovery electrolytic process involves the use of a particular cell, in which the polarity of the electrodes is periodically reversed, so as to obtain total detachment of the metallic lead deposited on the cathodes. In addition, the cell is so made as to extract the lead detached from the cathodes along with the electrolyte flow, which conveys the mass from the cell to the filters for separation of the solid phase, consisting of metallic lead, and allowing recycle of a clear solution to the electrolytic cell. In order to carry out the electrolysis with a clear solution, so as to obtain a very clean deposit of lead on the cathode and to extract at the same time the lead present in the insoluble silicates, two devices are associated with the electrolytic cell and operate in a closed circuit with the cell. The first one is a mixer, in which the mass is kept in suspension at the same temperature at which the electrolysis is carried out. Inside the mixer there is a suspension consisting of the solution of soluble silicates and a solid, i.e. the insoluble silicates. A predetermined quantity of the suspension is continually extracted from the mixer and sent to a filter. The clear liquid phase that is separated in the filter is sent to the cell to be electrolyzed, while the solid is recycled into the mixer. The continuous supply of liquid to the cell causes it to be filled up, so that a continuous flow of clear solution exits from the cell and is recycled to the mixer. By operating in this way, the lead present in the solution is deposited in the electrolytic cell and the progressive decrease of the concentration causes the solubilization of the lead fixed in the insoluble silicates.

The essential steps of the process are the following:

The first operation of the process of the invention, is the treatment of the lead glass with an aqueous solution of a strong alkaline substance, such as sodium or potassium hydroxide. The treatment can be carried out in different ways but, since this is a solid/liquid reaction, the reaction is facilitated if the solid phase, consisting of the lead glass, has a very fine particle size and by operating at a temperature above 180° C., preferably between 200 and 250° C. The fineness of the glass grain size accelerates the reaction but the use of too fine particles is not convenient, because they are expensive to obtain. A glass with less than 1 mm grain size is sufficiently reactive to allow completion of the reaction in 120 minutes.

At the end of the reaction a transparent solution is obtained that contains soluble silicates, sodium plumbite and lead silicate and a solid mass of insoluble silicates. The weight ratio between lead glass and 100% sodium hydroxide, to obtain an optimal etching of the glass, is between 2.8 and 3.5, preferably between 3.2 and 3.4. The concentration of the alkaline solution can vary from 5% to 50%, preferably from 20% to 50% by weight. The temperature of the reaction is of great importance because it should be at least 200° C. in order to work with industrially acceptable times. Where the ratio R between silica and sodium oxide is to be increased, the mass is added with a metered quantity of silica at the end of the alkaline etching, this compound being obtainable in this process with an acid treatment of the soluble silicate being produced. However, the silica can also be added to the soluble silicates obtained at the end of treatment. The next operation of the process consists in the electrolytic recovery of lead from the suspension formed by the soluble and insoluble silicates. The electrolytic cell can be conveniently made of plastic material while the electrodes, i.e. cathodes and anodes, can be made of stainless steel, such as AISI 304 or 316. Typical operating conditions of electrolysis are: electric current density between 50 and 1000 $A/m^2$, preferably between 100 and 800 $A/m^2$, temperature between 30 and 80° C., preferably between 30 and 75° C., distance between the monopolar or bipolar configuration electrodes, between 5 and 40 mm, preferably between 10 and 30 mm. During electrolysis, oxygen is generated at the anode while metallic lead is deposited on the cathode.

Exploiting the typical characteristics of these reactions, in order to obtain the detachment of the metallic lead deposit, the DC power of the cell is periodically reversed, so that previous cathodes become anodes and vice versa. The polarity reversal is suitably carried out after an electrolysis time comprised between 10 and 60 minutes, preferably between 15 and 30 minutes. The electrolysis is continued until the current yield is acceptable because, with low concentrations of lead in solution, a side reaction with hydrogen discharge prevails at the cathode. The residual lead present in the solution is totally eliminated by adding metallic zinc to obtain, in this way, cementation of lead as metal, which is replaced in solution by zinc ions, i.e. a non-toxic metal.

The liquid phase containing only soluble silicate is a raw material used in many fields, such as the formulation of special cements, water-based paints, and in the paper and wood industry. The same liquid phase, as previously indicated, can be treated with an acid, for example sulphuric, hydrochloric or carbonic obtaining the formation of silicon dioxide, solid $SiO_2$, and sodium or potassium salt of the acid being used. It is, therefore, convenient to use acids whose resulting sodium or potassium salts can be placed on the market and for this reason it is preferable to use carbonic acid, which generates sodium and potassium carbonate. The so obtained silica, called precipitated silica to distinguish it from the natural one often very impure, is a very pure substance that has a number of applications in major industries. This silica can be conveniently used to increase the ratio $R=SiO_2/Na_2O$ that characterizes the soluble silicates. Those obtained by the process described in the patent have an R value ranging between 1.6 and 1.8. Adding a correct amount of silica, obtained as reported in this patent, to the clear solution of silicates, heated to a temperature between 80 and 95° C., the silica rapidly dissolves and a new soluble silicate is eventually obtained with a predetermined R value, based on the initial silicate/added silica weight ratio.

Commercially, almost always the higher is the soluble silicates ratio R the grater may be their value.

The object of the invention can be better understood with the descriptions reported in the examples which are not to be understood as exhaustive in describing the potential of the invention.

EXAMPLE 1

The following masses are loaded in an autoclave: 600 kg of lead glass ground with a particle size less than 1 mm, 180 kg of 99.9% pure solid sodium hydroxide and 420 kg of water. The lead glass being used had a PbO content of 18.31% by weight, determined by X-ray diffraction, equal to 17% of Pb expressed as metal. The mass was heated to 205° C. and stirred for two hours. The registered autogenous pressure was 16 bar. At the end of the reaction, the mass was cooled and diluted with 900 liters of water. 102 kg of lead, expressed as metal, was found in the resulting suspension.

The suspension was transferred into a mixer and maintained under constant stirring at a temperature of 55-60° C. The suspension was continuously sent to a filter so as to separate the solid phase, constituted by insoluble silicates, fromt part of the liquid phase, consisting of sodium and potassium soluble silicates. The separated solid phase was recycled into the mixer while the separated liquid phase was sent into an electrolytic cell to recover the lead cathodically in the form of metal. The liquid phase, after passing through the cell, was recycled into the mixer to be mixed with the solid phase and sent again into the filter. All these operations are necessary because in the suspension, obtained after the dissolution of the glass, there is an equilibrium between the concentration of lead present in the liquid phase and the lead present in the solid phase, so that by proceeding with the electrolysis, the concentration of lead in solution decreases and the lead present in the solid phase gradually passes into the liquid one. In this way, practically the total of the lead present in the two phases can be recovered.

The electrolytic cell operates at a current density of 450 A/m² with a total current yield of 70-75%. The tank of the electrolytic cell was made of polypropylene and equipped with stainless steel AISI 304 electrodes. The polarity of electrodes has been reversed every 15 minutes, so obtaining automatic detachment of the deposited lead. The metallic lead has been collected on the bottom of the cell, which was suitably shaped in form of a hopper, so as to facilitate its extraction from the bottom with a flow of electrolyte produced by a pump. The suspension was conveyed into a hydrocyclone, so obtaining the separation of a wet solid fraction made up of metallic lead and a liquid fraction which has been recycled in the electrolytic cell and then from it to the mixer-filter. The electrolysis reaction was stopped when the concentration of lead in solution was stable at around 1.0-1.5 g/l. It is theoretically possible to recover all the lead from the solution by electrolysis, but this route is not economically advantageous when the lead is present at low concentrations, since the cathodic side reaction that generates hydrogen becomes predominant.

To recover all the lead present in the solution and to obtain soluble silicates exempt from this ion, the final solution was treated with a metered quantity of metallic zinc, so obtaining the cementation of lead as a metal on zinc which, in turn, is passed in the solution thus replacing the lead. In this way practically all the lead can be eliminated from the silicate solution with reduced costs. The final solution of soluble silicates was finally purified by removing the solid impurities consisting of metallic lead and possible excess of metallic zinc by filtration. The total mass of soluble silicates obtained amounted to 1500 kg, and had a density of 1.304 g/ml, a solids content of 31.7% by weight and a $SiO_2/Na_2O$ ratio R, expressed in moles, of 1.70. The separated insoluble fraction containing the insoluble silicates had a residual lead content lower than 0.2% by weight and its composition can be expressed with the following formula, expressed in moles:

$\Sigma(CaO+BaO+SrO+MgO+Na_2O+K_2O)=SiO_2$.

Such material appeared as a very fine powder 80% of which with a particle size of around 20 µm, and the remaining part of about 2 µm. Its particular fineness makes it suitable for most varied applications, for example as filler in water based paints, first/second material for the production of cements, ceramics, glass and abrasive materials. The recovered overall amount of metal lead, either by electrolysis or by cementation on zinc, amounts to 101.85 kg with a 99.85% recovery efficiency. The missing lead required to balance is found in the silicate separated at the end of electrolysis.

EXAMPLE 2

The procedure of Example 1 has been repeated, with the differences that the mass is cooled down and diluted with 600 liters of water at the end of the alkaline etching reaction on the ground glass. By operating as described in Example 1, 1200 kg of soluble silicate with a concentration of 37% by weight, a density of 1.38 g/ml and a value of R=1.7 were eventually obtained. The recovery of metallic lead and insoluble silicates were the same as those indicated in Example 1.

EXAMPLE 3

The procedure of Example 1 has been repeated, with the differences that the time of the alkaline etching reaction on the glass was reduced to 1 hour and 30 minutes, but the temperature was elevated to 215-218° C. The reaction mass was diluted with 400 kg of water, obtaining eventually 1000 kg of soluble silicate with a concentration of 41.9% by weight, density of 1.43 g/ml, and R=1.8 (by moles). The recovery of metallic lead was higher than 99.84%. Furthermore, the electrolysis reaction was carried out with a current density of 700 A/m², with a 15% reduction of the time for the electrolytic recovery of lead without significant changes on current efficiency.

EXAMPLE 4

1500 kg of a clear solution of soluble silicates, obtained as described in Example 1, having a concentration of 31.7% by weight of soluble silicates with a $SiO_2/Na_2O$ ratio in moles of 1.70, were introduced in an autoclave. The mass was heated up to 90° C. and gaseous $CO_2$ was introduced maintaining a pressure of 10 atm. The introduction of $CO_2$ was suspended when the pH of the mass was stabilized at the value of 7-7.2 and the pressure remained constant. The reaction of sodium silicate with $CO_2$ leads to the formation of solid silica ($SiO_2$) and sodium carbonate in solution. 295 kg of dry silica ($SiO_2$) were separated by filtration from the mass obtained.

EXAMPLE 5

A mass of 1500 kg of soluble silicates obtained as described in Example 1 was introduced in a reactor equipped with stirrer and maintained at a temperature of 95° C. The mass was added in 1 hour with 52 kg of silica obtained as described in Example 4. A solution of soluble silicates, in which the ratio $R=SiO_2/Na_2O$ is equal to 2 moles with respect to the initial value of 1.70, was eventually recovered.

What is claimed is:

1. A method for recovering lead from lead glass, the method comprising:
   heat etching of the lead glass with an alkaline aqueous solution to obtain a suspension comprising a liquid phase comprising soluble silicates, sodium plumbite, and soluble lead silicate, and a solid insoluble phase comprising insoluble silicates of all polyvalent cations originally present in the lead glass and part of the lead originally present in the lead glass;
   treating the suspension in an electrolytic cell to recover metallic lead in and to obtain a solution of the soluble silicates and the insoluble silicates in solid state without lead;
   treating the solution of the soluble silicates with an acid to form insoluble silica; and
   reacting the insoluble silica with the soluble silicates to increase the silica/oxide ratio of the soluble silicates.

2. The method according to claim 1, wherein the alkaline aqueous solution comprises sodium hydroxide or potassium hydroxide.

3. The method according to claim 1, wherein the alkaline aqueous solution has a concentration between 20 and 50% by weight and the weight ratio between the lead glass and 100% sodium hydroxide is between 2.8 and 3.5.

4. The method of claim 3, wherein the weight ratio between lead glass and 100% sodium hydroxide is between 3.2 and 3.4.

5. The method according to claim 1, wherein the heat etching of the lead glass is carried out with the alkaline aqueous solution at a temperature above 200° C.

6. The method according to claim 1, wherein a mass resulting from the heat etching of the lead glass is subjected to electrolysis to recover the metallic lead, the solution of soluble silicates and one of the insoluble silicates, all lead-free.

7. The method according to claim 6, wherein the mass is subjected to electrolysis in a cell in which the polarity of the electrodes is periodically reversed, in order to obtain the detachment of the lead from a cathode surface and extraction thereof from a bottom of the cell.

8. The method according to claim 1, wherein the electrolytic cell operates in series with a mixer and a filter, so that the electrolytic cell receives the soluble silicates while the insoluble silicates are recycled into the mixer.

9. The method according to claim 1, wherein the treating the lead-free solution of the soluble silicates with the acid forms the insoluble silica and a mixture of soluble salts obtained from the acid.

10. The method according to claim 1 further comprising adding the soluble silicates obtained at the end of the electrolysis reaction with metallic zinc in order to eliminate residual lead in the solution by a cementation reaction on the metallic zinc.

* * * * *